United States Patent [19]

Geiger

[11] Patent Number: 4,963,804
[45] Date of Patent: Oct. 16, 1990

[54] APPARATUS AND METHOD FOR REDUCING VIBRATION OF ROTATING MACHINERY

[75] Inventor: Thomas L. Geiger, Valencia, Pa.

[73] Assignee: Westinghouse Electric Corp., Pittsburgh, Pa.

[21] Appl. No.: 377,503

[22] Filed: Jul. 10, 1989

[51] Int. Cl.$^5$ .............................................. F16F 15/00
[52] U.S. Cl. ...................... 318/460; 310/51; 73/660
[58] Field of Search ............... 318/460, 128, 115, 119, 318/629, 630, 632, 611, 623, 628, 129, 130; 310/20, 36, 37, 51, 81; 73/66, 462, 471, 486, 660, 662–669, 778; 186/1 B

[56] References Cited

U.S. PATENT DOCUMENTS

| | | | |
|---|---|---|---|
| 2,361,071 | 10/1944 | Vang | 188/1 |
| 3,269,320 | 8/1966 | Tilley et al. | 103/25 |
| 3,477,665 | 11/1969 | Legrand | 244/12.25 |
| 3,566,993 | 3/1971 | Leatherwood | 310/51 X |
| 3,729,691 | 4/1973 | Beiswinger et al. | 318/128 X |
| 3,830,099 | 8/1974 | Ichikawa | 73/668 |
| 4,025,724 | 5/1977 | Davidson, Jr. et al. | 179/1 P |
| 4,083,433 | 4/1978 | Geohegan Jr. et al. | 188/1 B |
| 4,372,162 | 2/1983 | Shutt | 73/517 B |
| 4,453,770 | 3/1984 | Shiohata et al. | 73/660 |
| 4,541,772 | 9/1985 | Becker | 415/90 |
| 4,550,812 | 11/1985 | Mard | 188/379 |
| 4,614,117 | 9/1986 | Taniguti | 73/660 X |
| 4,626,754 | 12/1986 | Habermann et al. | 318/460 |
| 4,633,982 | 1/1987 | Swigert | 188/267 |
| 4,640,770 | 2/1987 | Smith | 210/144 |
| 4,716,347 | 12/1987 | Fujimoto | 318/460 |
| 4,761,101 | 8/1988 | Zettl | 73/660 X |
| 4,800,306 | 1/1989 | Oberto | 310/51 |
| 4,806,835 | 2/1989 | Habermann | 318/632 X |
| 4,808,863 | 2/1989 | Andersson | 310/51 |

FOREIGN PATENT DOCUMENTS 53-28806  3/1978  Japan .

OTHER PUBLICATIONS

Articles entitled "Noise and Vibration in a Large Circulating Water Pump", No. 17, Nov. 1974, APE Engineering, pp. 27–32.
Reduction of Vibrational Torque in 2-Phase Servomotors Electric Power Applications, Oct. 1979, vol. 2, No. 5, pp. 161–166.

Primary Examiner—William M. Shoop, Jr.
Assistant Examiner—A Jonathan Wysocki

[57] ABSTRACT

A vibration reduction apparatus uses a electromagnetic exciter mechanism to reduce vibrations induced in a machine by a rotating component of the machine. The electromagnetic exciter mechanism employs a magnetic inertial mass coupled in a non-contacting manner externally on a housing of the machine remote from the vibration-inducing rotating component. To operate the electromagnet exciter mechansim, the apparatus employs a vibration sensor attached externally on the machine housing. The sensor senses the vibrations and generates an output signal representative thereof. Also, the apparatus employs signal processing units coupled to the machine for sensing the frequency of an electrical input power signal to the machine which drives the rotating component and generating an output signal representative thereof. The signal processing units also process the output signal representative of the induced vibrations together with the output signal representative of the input power frequency, compare the processed signals with a standard signal representative of previous vibration correcting signals and in response thereto produce and apply a new correcting signal to a power signal producing unit of the apparatus for modulating an input power signal to prodcue a corrected input power signal for operating the electromagnetic exciter mechanism to reduce the magnitude of vibrations induced at the preselected location on the machine housing by the rotating component.

15 Claims, 3 Drawing Sheets

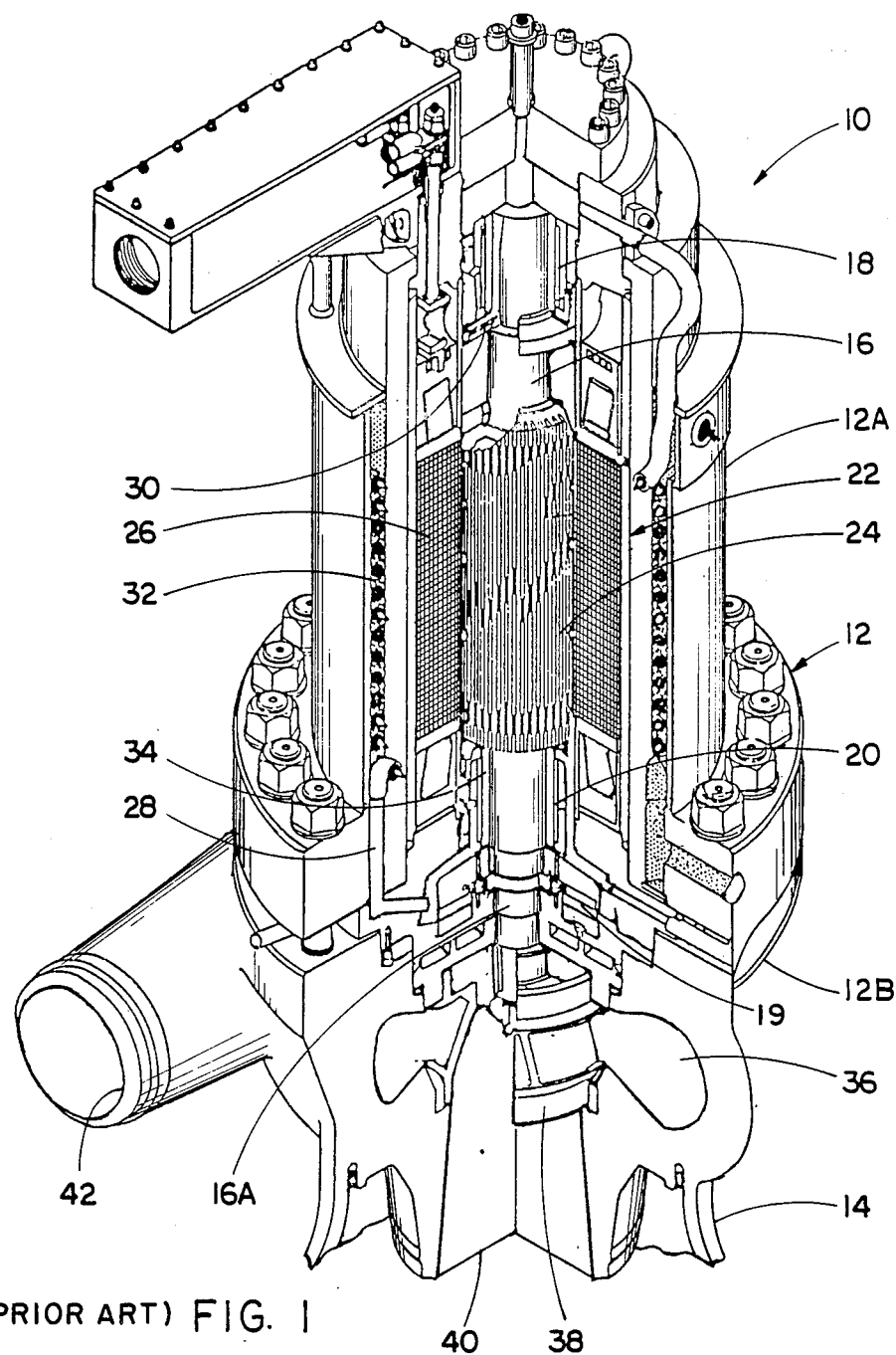
(PRIOR ART) FIG. 1

APPARATUS AND METHOD FOR REDUCING VIBRATION OF ROTATING MACHINERY

BACKGROUND OF THE INVENTION

1. Field of the Invention

The present invention relates generally to mechanical vibration reduction and, more particularly, is concerned with an apparatus and method for automatically reducing vibration of a machine having a rotating component, particularly such as a water-cooled pump having a central rotating shaft.

2. Description of the Prior Art

A common problem in all types of rotating machinery is vibration induced by misalignment, unbalance, functional interactions, and dimensional tolerance variations of rotating components of the machinery. The vibrations occur at a number of frequencies. One frequency of particular concern and interest in machinery such as a water circulating pump is the frequency equal to the running speed of the rotating component.

The particular water pump in question has an upright housing fastened at its lower end to a mounting structure and a central drive shaft rotatably mounted vertically in the housing by a pair of upper and lower radial bearings. The central drive shaft is positioned axially in the housing by a thrust bearing Rotor and stator components of an electric motor for driving the pump drive shaft are incorporated in the housing between the locations of the bearings and an impeller is attached to the lower end of the shaft for rotation therewith to draw water in a central bottom suction nozzle and pump water from a side discharge nozzle on the pump housing The pump also incorporates an internal auxiliary system for pumping water internally along the portion of its shaft which is coextensive with the components of the pump motor for water-cooling the motor.

Rotation of the central drive shaft of the pump induces radial vibratory forces on the upright housing through the radial bearings and through the cooling water between the motor rotor and stator components. The presence of the cooling water in that annulus serves to amplify the radial vibratory forces on the housing. Through the impeller interaction with the pumped water, the central drive shaft also induces axial vibratory forces on the housing through the axial thrust bearing. In response to these vibratory forces, the housing vibrates at the frequency of the rotating speed of the drive shaft in several modes of vibration. One mode is a lateral vibration which results in side-to-side rocking movement of the drive shaft and pump housing. Another mode is an axial vibration which results in up-and-down movement of the drive shaft and pump housing. The motions resulting from these vibratory modes are transmitted both to the water being pumped by the pump impeller and to the mounting structure via the lower end of the housing where the pump is rigidly fastened to the mounting structure.

As can be readily realized, these vibrations are a problem and highly undesirable in many applications for a pump of this general construction. Consequently, a need exists for an improved technique for reducing vibration induced in a machine by a rotating component of the machine.

SUMMARY OF THE INVENTION

The present invention provides a vibration reducing apparatus and method designed to satisfy the aforementioned needs. The present invention reduces the magnitude of vibration of the pump housing induced by the rotating central drive shaft of the pump, without involving contact with or design modification of the rotating shaft and without introducing any components into the interior of the pump. Instead, the present invention provides an electromagnetic exciter mechanism having at least one inertial mass for coupling to the exterior of the pump housing and electrical components for generating correcting signals and electromagnetically driving the inertial mass for producing vibratory reaction forces in the pump housing of a magnitude and phase to substantially reduce the vibrations induced by rotating shaft.

Thus, the present invention represents an external approach to machine vibration reduction that is much more simple and direct than that of prior art internal approaches, such as use of magnetic bearings internally of the machine to rotatably mount the vibration-inducing shaft. Also, in a case where the machine is a sealed water-cooled pump, the present invention does not require penetration of any pressure barrier of the pump housing. The external approach avoids exposure of the shaker mechanism to any unusual environmental conditions such as extreme temperatures or pressures or contact with corrosive fluids. The external components of the present invention are easily accessible for modification, repair or replacement and are readily retrofittable to installed machines, whereas internal components of the prior art are not The advantages of the present invention are applicable to all machinery having rotating components.

Accordingly, the present invention is directed to an apparatus for use in reducing vibrations at a preselected location on a housing of a machine wherein the machine has a rotating component mounted to the housing which induces the vibrations therein, the rotating component being driven by an input electrical power signal supplied to the machine The vibration reduction apparatus, which is capable of reducing the vibrations in the machine housing without access to the rotating component, comprises: (a) at least one electromagnetic exciter mechanism for coupling externally on the machine housing remote from the vibration-inducing rotating component of the machine, the electromagnetic exciter mechanism being operable for inducing electromagnetic reaction forces in the machine housing which substantially reduce the magnitude of the vibrations induced by the rotating component; (b) at least one vibration sensor attachable externally on the machine housing at the preselected location where the vibrations are to be reduced, the sensor for sensing the vibrations and generating an output signal representative thereof; (c) an electrical power means electrically connected to the electromagnetic exciter mechanism for generating and applying an input power signal to the electromagnetic exciter mechanism for operating the same; and (d) signal processing means coupled to the machine for sensing the frequency of the input power signal to the machine and generating an output signal representative thereof, the signal processing means being electrically connected to the power means and the vibration sensor for receiving the output signal from the sensor and processing the sensor output signal representative of the induced vibrations together with the output signal representative of the input power frequency, comparing the processed signals with a standard signal representative of previous vibration correcting signals and in response thereto producing and applying a new correcting signal to the power means for modulating the input power signal to produce a corrected input power signal for operating the electromagnetic exciter mechanism to reduce the magnitude of vibrations induced at the preselected location on the machine housing by the rotating component.

The present invention is further directed to the electromagnetic exciter mechanism which includes a magnetic inertial mass, and electromagnetic means surrounding the inertial mass. The electromagnetic means is a plurality of orthogonally-arranged electromagnets being operable for generating electromagnetic forces which move the mass in a vibratory manner in directions along each of three orthogonal axes and thereby induce opposite reaction forces in the pump housing which reduce the vibrations induced at the preselected location by rotating component. Further, the electromagnets are operable for generating electromagnetic forces which levitate the inertial mass out of contact with the electromagnets and the machine housing.

The present invention is also directed to a method for use in reducing vibrations at a preselected location on a housing of a machine being induced by a rotating component mounted to the machine housing wherein the method comprises the steps of: (a) externally coupling at least one electromagnetic exciter mechanism on the machine housing remote from the vibration-inducing rotating component of the machine, the shaker mechanism being operable for inducing reaction forces in the machine housing which substantially reduce the magnitude of vibrations induced by the rotating component; (b) externally on the machine housing at the preselected location where the vibrations are to be reduced, sensing the vibrations induced by the rotating component and generating an output signal representative thereof; (c) sensing the frequency of an input power signal to the machine and generating an output signal representative thereof; (d) receiving the output signal representative of the induced vibrations sensed and processing such output signal representative of the induced vibrations together with the output signal representative of the input power frequency; (e) comparing the processed signals with a standard signal representative of previous vibration correcting signals and in response thereto producing a new correcting signal; and (f) generating a power signal and applying the new correcting signal for modulating said power signal to produce a corrected input power signal for operating the electromagnetic exciter mechanism to reduce the magnitude of vibrations induced at the preselected location on the machine housing by the rotating component.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a cutaway perspective view of a prior art water circulation pump.

DETAILED DESCRIPTION OF THE INVENTION

Figure 3:
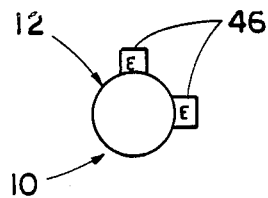
FIG. 3 is a top plan view of the pump and a pair of electromagnetic exciter mechanisms coupled thereto as seen along line 3—3 of FIG. 2.

In the following description, like reference characters designate like or corresponding parts throughout the several views of the drawings. Also in the following description, it is to be understood that such terms as "forward", "rearward", "left", "right", "upwardly", "downwardly", and the like, are not to be construed as limiting terms.

In General

Referring now to the drawings, and particularly to FIG. 1, there is illustrated an example of machinery which commonly undergoes vibration induced by a rotating component thereof In particular, the machinery illustrated is a conventional water circulation pump, generally designated 10, to which the present invention can be applied.

The water pump 10 has an upright housing 12 with an upper motor housing portion 12A and a lower impeller housing portion 12B. The housing 12 is rigidly fastened at a lower end of its lower impeller housing portion 12B to a mounting structure 14 by a weldment. The water pump 10 also has a central drive shaft 16 rotatably mounted vertically in the upper and lower portions 12A, 12B of the housing 12 by a pair of vertically-spaced upper and lower radial bearings 18, 20 and by a thrust bearing 19 located within the upper housing portion 12A.

An electrical motor 22 is incorporated internally within the upper motor housing portion 12A of the pump housing 12 between the bearings 18, 20 thereof for rotatably driving the central shaft 16. In particular, the motor 22 includes an inner annular rotor 24 and an outer annular stator 26. The inner rotor 24 is attached to and encompasses the shaft 16. The outer stator 26 is mounted to the upper motor housing portion 12A of the stationary pump housing 12, surrounding and spaced radially outwardly from the rotor 24.

Further, the pump 10 incorporates an internal auxiliary pumping system 28 for water-cooling the motor 22. The auxiliary pumping system 28 includes an auxiliary impeller 30 attached to the shaft 16 proximate to the upper radial bearing 18. The auxiliary impeller 30 and a heat exchanger coil 32 are connected in flow communication by a closed flow path 34 defined internally in the upper motor housing portion 12A. Cooling water is pumped by the auxiliary impeller 30 to flow along the flow path 34 adjacent to the rotor 24 and stator 26 of the motor 22 and along the portion of the pump central drive shaft 16 coextensive therewith for transfer of heat therefrom to the water for cooling the motor 22.

The pump 10 also has an annular cavity 36 defined in the lower impeller housing portion 12B of the pump housing 12 and a main impeller 38 disposed within the cavity 36 and attached to the lower end 16A of the drive shaft 16 for rotation therewith. The housing portion 12B has a central bottom suction inlet nozzle 40 and a side discharge outlet nozzle 42 defined therein which communicate with the cavity 36. Operation of the electric motor 22 to rotatably drive the shaft 16 causes the main impeller 38 to rotate and draw water in the bottom inlet nozzle 40 and pump water from the side outlet nozzle 42 on the pump housing 12. At the same time, the internal auxiliary pumping system 28 pumps cooling water about the internal flow path 34 for water-cooling the motor 22.

Rotation of the central drive shaft 16 of the pump 10 by the internal motor 22 induces radial vibratory forces on the upright pump housing 12 through the radial bearings 18 and 20 and through the cooling water between the motor rotor 24 and stator 26 components. The presence of the cooling water in that annulus serves to amplify the radial vibratory forces on the housing 12. Through the impeller 38 interaction with the pumped water, the central drive shaft 16 also induces axial vibratory forces on the housing 12 through the axial thrust bearing 19. In response to those vibratory forces, the pump 10 vibrates at the frequency of the rotating speed of the drive shaft 16 in several modes of vibration. One mode is a lateral vibration which results in side-to-side rocking movement of the drive shaft 16 and pump housing 12. Another mode is an axial vibration which results in up-and-down movement of the drive shaft 16 and pump housing 12 The three-dimensional motions resulting from these vibratory modes are undesirably transmitted both to the water being pumped by the pump main impeller 38 and to the mounting structure 14 at the lower end of the impeller housing portion 12B where the pump 10 is rigidly fastened to the mounting structure 14.

Vibration Reduction Apparatus of the Present Invention

Figure 2:
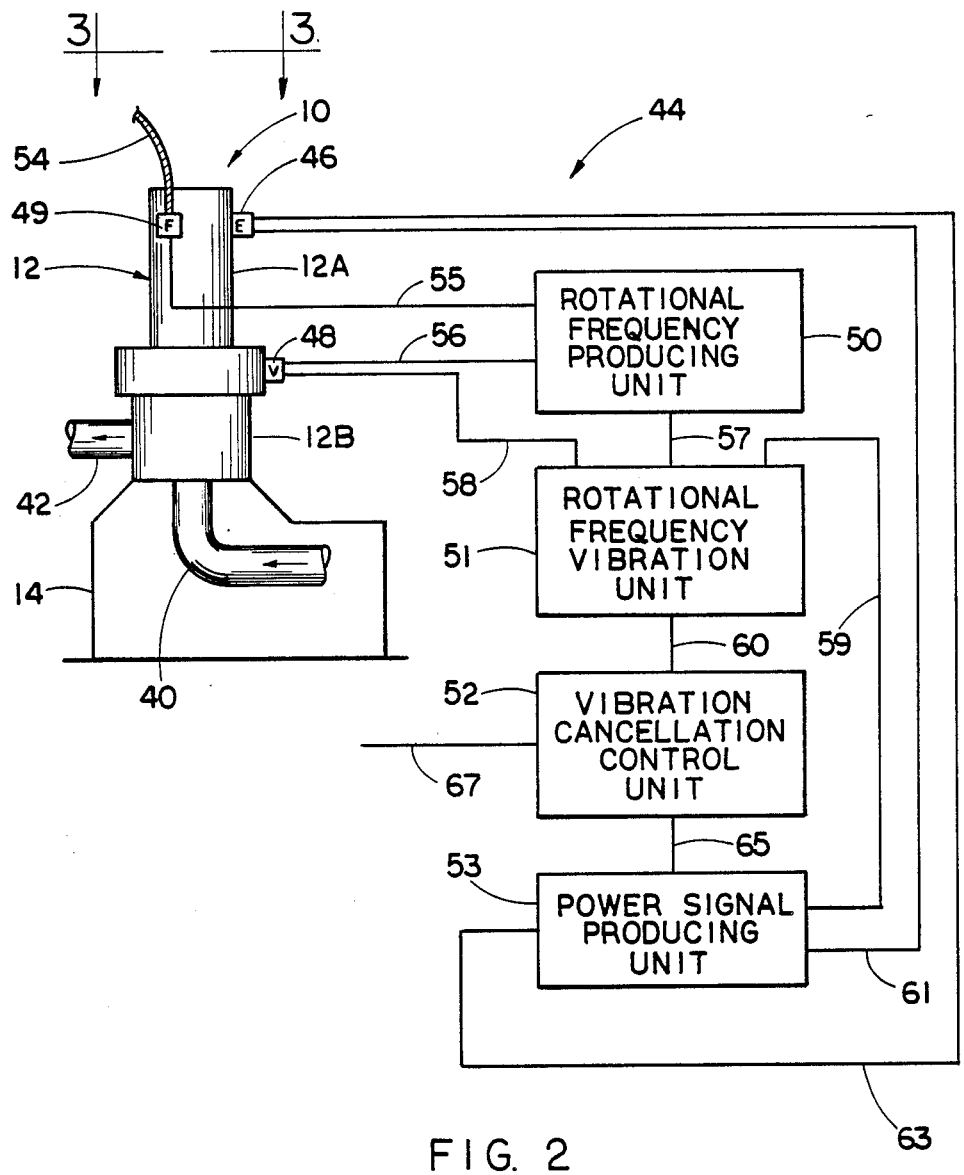
FIG. 2 is a side elevational schematical view of a vibration reduction apparatus constructed in accordance with the present invention applied to an external housing of the pump of FIG. 1.

Turning to FIG. 2, there is schematically illustrated an apparatus, generally designated 44, having at least one electromagnetic exciter mechanism 46 which can be employed externally on the pump housing 12 to reduce vibrations thereof induced, for example, by normal unbalance of its rotating shaft 16, the induced vibrations being manifested particularly at the location where the pump housing 12 is rigidly fastened to the mounting structure 14. As shown in FIG. 2, the apparatus 44 is particularly configured to reduce vibrations at the lower end of the pump housing 12. However, it can be easily reconfigured for reduction of vibration at any point on the pump housing 10 or on the mounting structure 14.

In addition to the one electromagnetic exciter mechanism 46, the vibration reduction apparatus 44 basically includes at least one vibration sensor (V) 48, a motor power frequency sensor (F) 49, a rotational frequency producing unit 50, a rotational frequency vibration unit 51, a vibration cancellation control unit 52, and a power signal producing unit 53. Since the novelty of the apparatus 44 resides in its combination of components and in the construction of the electromagnetic exciter mechanism 46, and not in the specific details of the motor power frequency sensor 49 and the units 50-53, it is believed not necessary to illustrate nor describe these latter devices in detail herein. To do so would not lead to a clearer and better understanding of the present invention, but instead would tend to burden the disclosure with details which are otherwise readily apparent to those skilled in the art in view of the functional description of these latter devices presented hereinafter.

The vibration sensor 48 of the vibration reduction apparatus 44 is preferably an accelerometer, such as a high performance piezoelectric device commercially available from Endevco. As seen in FIG. 2, the sensor 48 is attachable externally on the pump housing 12 necessarily at the preselected location where the vibrations are to be reduced The sensor 48 senses the vibrations at such location and generates an output signal representative thereof It should be understood that more than one sensor 48 can be deployed on the pump housing 12.

The motor power frequency sensor 49 of the vibration reduction apparatus 44 is a commercially available device. As seen in FIG. 2, the sensor 49 is attachable externally on the pump housing 12 preferably at the preselected location where the leads of the motor power cable 54 are connected to terminals on the housing 12. Through an electrical connection with the terminals, the sensor 49 senses the frequency of the alternating current driving the motor 22 (FIG. 1) in the housing 12 and generates an output signal representative thereof. It should be understood that the sensor 49 could be deployed elsewhere in the motor power supply system, such as at a control center.

The rotational frequency producing unit 50, the rotational frequency vibration unit 51, and the vibration cancellation control unit 52 together provide means for performing certain signal processing functions in the vibration reduction apparatus 44 which will now be described. The rotational frequency producing unit 50 of the vibration reduction apparatus 44 is electrically connected by a lead 55 to the motor power frequency sensor 49, by a lead 56 to the vibration sensor 48, and by a lead 57 to the rotational frequency vibration unit 51. The rotational frequency producing unit 50 receives the output signal of the motor power frequency sensor 49 on the lead 55 and converts, through the number of poles in the induction motor 22 (FIG. 1), the power frequency to the drive shaft synchronous frequency. The rotational frequency producing unit 50 further receives the output signal of the vibration sensor 48 on the lead 56 and produces a fast fourier transformation which is searched for the frequency at which a peak amplitude occurs. The search is for an amplitude spike which always occur at a known integer multiple of the shaft rotational frequency and to always have the largest amplitude in a frequency range of reasonable size. The upper end of the range is the multiple times the synchronous frequency The lower end of the range depends upon the expected maximum full-load slip. Upon completion of the search, the drive shaft rotational frequency is determined by dividing the found frequency by the known multiple. The drive shaft rotational frequency signal is transferred on the lead 57 to the rotational frequency vibration unit 51.

The rotational frequency vibration unit 51 of the vibration reduction apparatus 44 is electrically connected by a lead 58 to the vibration sensor 48, by the lead 57 to the rotational frequency producing unit 50, by a lead 59 to the power signal producing unit 53, and by a lead 60 to the vibration cancellation control unit 52. The rotational frequency vibration unit 51 receives the output signal of the rotational frequency producing unit 50 on the lead 57 and uses that frequency to set up a narrowband filter. The rotational frequency vibration unit 51 receives the output signal of the vibration sensor 48 on the lead 58 and passes it through the narrowband filter to determine the amplitude of vibration of the pump housing 12 at the location of the vibration sensor 48. The rotational frequency vibration unit 51 receives the output signal of the power signal producing unit 53 on the lead 59 and matches that waveform with the filtered signal to determine the phase angle. Signals representative of the drive shaft rotational frequency, the amplitude and phase, at that frequency of the pump housing vibration at the vibration sensor 48 are transmitted on the lead 60 to the vibration cancellation control unit 52.

Figure 4:
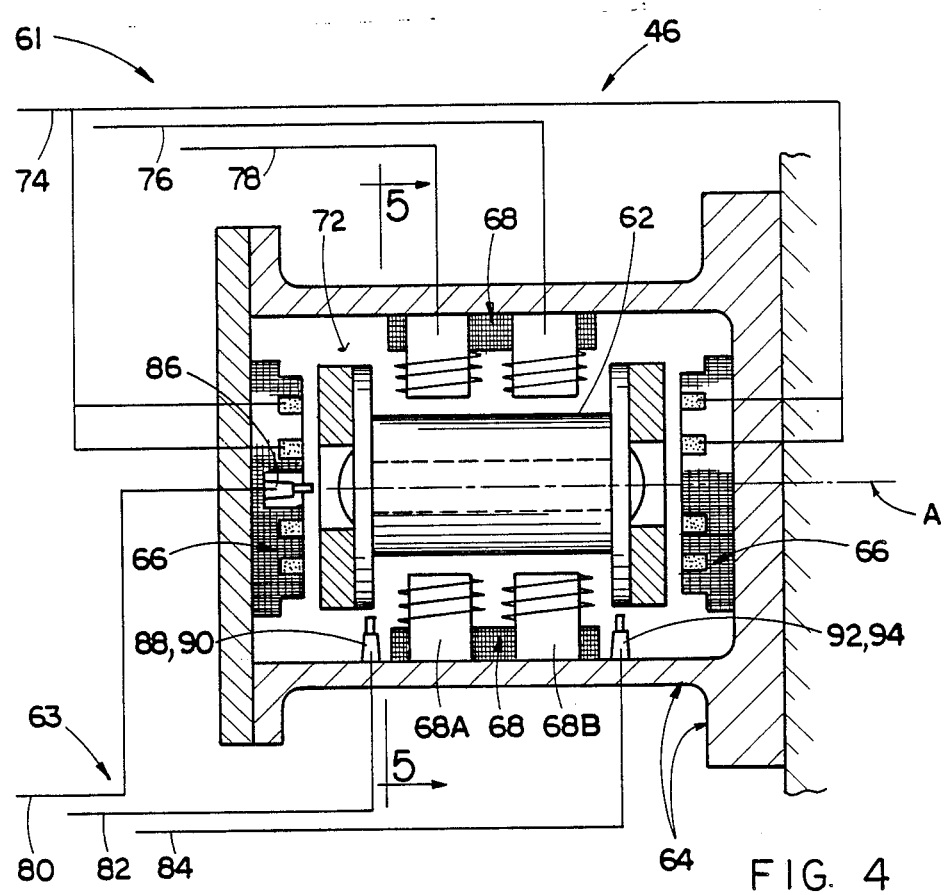
FIG. 4 is an enlarged side elevational schematical view of a electromagnetic exciter mechanism of the vibration reduction apparatus of FIG. 2.
Figure 5:
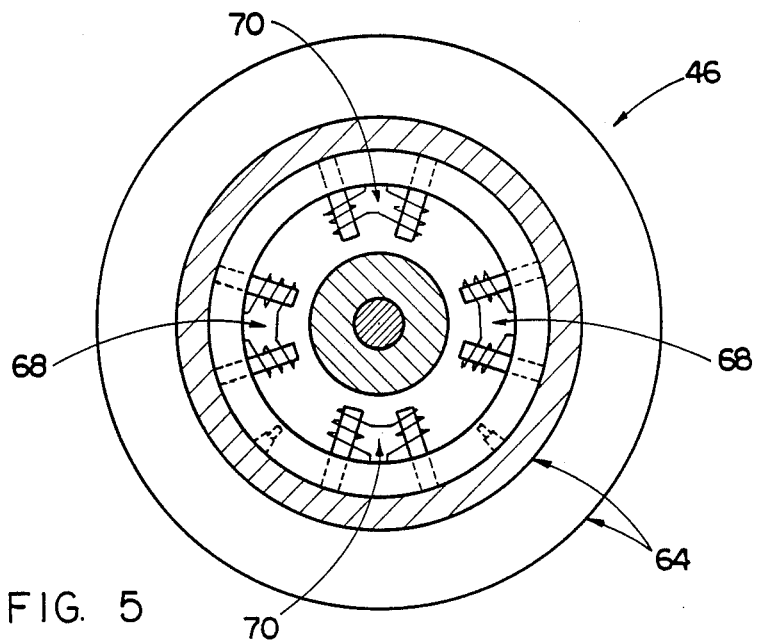
FIG. 5 is cross-sectional view of the electromagnetic exciter mechanism taken along 5—5 of FIG. 4.

The electrical power signal producing unit 53 of the vibration reduction apparatus 44 is electrically connected by a lead 61 to the electromagnetic exciter mechanism 46 for generating and applying an input power signal thereto for operating the same. The electrical power signal producing unit 53 is also electrically connected to an external power source (not shown) and by another lead 63 to the electromagnetic exciter mechanism 46. As seen in FIGS. 4 and 5, the electromagnetic exciter mechanism 46 has an inertial mass 62, a cylindrical can-like casing 64 mounted externally on the pump housing 12 remote from the vibration-inducing rotating shaft 16 of the pump 10, and electromagnetic means preferably in the form of a plurality of pairs of electromagnets 66, 68, 70 mounted to the casing 64. By lead 63 from the electromagnetic exciter mechanism 46, the power signal producing unit 53 receives signals representative of the position of the inertial mass 62 relative to the adjacent surfaces of electromagnets 66, 68, 70 inside the shaker mechanism 46. As part of the determination of the electrical power signal produced by the power signal producing unit 53, the static position of the inertial mass 62 is monitored and the direct current signals necessary to levitate the inertial mass 62 are computed. The input electrical power signal transferred on lead 61 to the electromagnetic exciter mechanism 46 for operating the same contains both alternating and direct-current.

The vibration cancellation control unit 52 of the vibration reduction apparatus 44 is electrically connected by leads 60, 65 between the rotational frequency vibration unit 51 and the power signal producing unit 53. The vibration cancellation control unit 52 receives the output signals of the rotational frequency vibration unit 51 on the lead 60 and compares the vibration amplitude signal to a standard or predetermined signal, provided by any suitable means (not shown) on a lead 67, which, for instance, is representative of the known sensitivity of the vibration sensor 48, the goal of the vibration reduction scheme. If the vibration amplitude signal is lower than the standard signal, no changes will be made; but if not, the vibration frequency, amplitude, and phase along with the current correcting input power signal will be compared in an algorithm with previously stored values of sets of frequency, amplitude, phase, and correcting input power signal. Such comparison produces a correcting signal which is transferred on the lead 65 to the power signal producing unit 53 for modulating the input power signal to produce a corrected input power signal for operating the electromagnetic exciter mechanism 46 in a manner which reduces the magnitude of vibrations induced at the preselected location on the pump housing 12 by the rotating shaft 16.

One electromagnetic exciter mechanism 46 of the apparatus 44 is illustrated in FIG. 2 mounted externally on the upper motor portion 12A of the pump housing 12, whereas a pair of electromagnetic exciter mechanisms 46 are seen in FIG. 3 being mounted about 90 degrees from one another. Thus, one or more electromagnetic exciter mechanisms 46 can be employed and at various displaced positions. The electromagnetic exciter mechanism 46 is mounted externally on the machine housing 12 and thereby remote from the vibration-inducing rotating central drive shaft 16 located internally of the pump 10. It can readily be realized that there is no physical connection of the electromagnetic exciter mechanism 46 with the pump shaft 16 whose vibratory motions induce the pump housing vibration which the electromagnetic exciter mechanism 46 is employed to cancel out or reduce.

As briefly described earlier, as seen in FIGS. 4 and 5 the electromagnetic exciter mechanism 46 has the inertial mass 62. The inertial mass 62 is magnetic which for purposes herein means that it is composed of ferromagnetic material, such as electrical steel, responsive to electromagnetic pull forces when imposed on it. The inertial mass 62 is disposed in a non-contacting frictionfree relation with the pump housing 12 but still is operable for inducing electromagnetic forces in the pump housing 12 which substantially reduce the magnitude of the vibrations induced by the rotating shaft 16.

More particularly, also as briefly described earlier and seen in FIGS. 4 and 5, the electromagnetic exciter mechanism 46 includes the cylindrical can-like casing 64 mounted externally on the pump housing 12 remote from the vibration-inducing rotating shaft 16 of the pump 10, and the electromagnets 66, 68, 70 are rigidly mounted to the walls of the casing 64 in the positional relationship seen in FIGS. 4 and 5. The casing 64 defines a cavity 72 within which is disposed the inertial mass 62 between the electromagnets 66, 68, 70.

The corrected input power signal from the power signal producing unit 53 is precisely modulated for operating the electromagnets 66, 68, 70 to generate electromagnetic forces that cause magnetic levitation, or suspension, of the inertial mass 62 out of contact with the electromagnets 66, 68, 70 and the casing 64. The input power signal is further modulated for operating the electromagnets 66, 68, 70 to also generate electromagnetic forces which cause vibratory movement of the inertial mass 62 relative to the electromagnets 66, 68, 70, and thereby to the casing 64 and the pump housing 12, along each of three orthogonal x-y-z axes. It is this relative movement between the inertial mass 62 and the housing 12 which results in compensatory vibratory motion of the housing 12 due to electromagnetic reaction forces being induced in the casing 64. This induced vibratory motion of the housing 12 at the location of the electromagnetic exciter mechanism 46 substantially reduces the magnitude of vibrations induced in the pump housing 12 initially by the rotating shaft 16.

As seen in FIGS. 4 and 5, the electromagnets 66 in the first pairs are positioned in opposing relation about 180 degrees from one another adjacent to but spaced from respective opposite axial ends of the inertial mass 62. In such positions, the first electromagnets 66 can generate two electromagnetic forces which alternately pull the inertial mass 62 in a vibratory or oscillatory type motion in a first direction along or parallel to the axis A of the mass 62. Next, the electromagnets 68 in the second pairs are positioned in opposing relation about 180 degrees from one another adjacent to but spaced from opposite sides of inertial mass 62. In such positions, the second electromagnets 68 can generate two other electromagnetic forces which alternately pull the inertial mass 62 in a vibratory or oscillatory type motion in a second direction being orthogonal to the first axial direction. Finally, the electromagnets 70 in the third pairs are positioned in opposing relation about 180 degrees from one another on opposite sides of the inertial mass 62 and displaced about 90 degrees from the respective second electromagnets 68. In such positions, the third electromagnets 70 can generate still another two electromagnetic forces which alternately pull the inertial mass 62 in a vibratory or oscillatory type motion in a third direction being orthogonal to both the first and second directions. Therefore, the pairs of electromagnets 66, 68, 70 can be operated to cause relative vibratory movement between the inertial mass 62 and the pump housing 12 in three orthogonal directions to produce vibration reduction on the pump 10 axially, torsionally, and laterally. The input lead segments 74, 76, 78 shown in FIG. 4 compose the lead 61 previously identified connecting the electromagnetic exciter mechanism 46 and the power signal producing unit 53. The output lead segments 80, 82, 84 shown in FIG. 4 compose the lead 63 previously identified connecting the electromagnetic exciter mechanism 46 and the power signal producing unit 53.

The state of levitation of the inertial mass 62 is sensed by the position sensors 86, 88, 90, 92, 94. The location of the inertial mass 62 along the axis A is measured by position sensor 86 To locate the inertial mass 62 laterally, the other four sensors 88, 90, 92, 94 are required because the mass can both translate and rotate. One pair of the sensors 88, 90, located about ninety degrees apart, sense the lateral position of one end of the inertial mass 62. The other pair of sensors 92, 94, located about ninety degrees apart, sense the lateral position of the other end of the inertial mass 62. In response to the static position indications, as determined in the power signal producing unit 53, the direct current signals to the electromagnets 66, 68, 70 produce the centering and levitating forces. Axial centering forces are produced by the electromagnets 66. Lateral translation forces are produced by the direct current in the electromagnet pairs 68, 70. For instance, the translational force is the average of the steady forces in the electromagnet sub-pairs 68A, 68B. Lateral rotation forces are produced by the difference in the steady forces produced by electromagnet sub-pairs 68A, 68B. In the plane ninety degrees away, electromagnet sub-pairs 70A, 70B produce steady forces to complete the centering of the inertial mass 62.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A vibration reduction apparatus for use in reducing vibrations at a preselected location on a housing of a machine, the machine having a rotating component mounted to the housing which induces the vibrations therein, the rotating component being driven by an input electrical power signal supplied to the machine, said apparatus capable of reducing the vibrations in the machine housing without access to the rotating component, said vibration reduction apparatus comprising:

(a) at least one electromagnetic exciter mechanism for coupling externally on the machine housing remote from the vibration-inducing rotating component of the machine, said electromagnetic exciter mechanism being operable for inducing electromagnetic reaction forces in the machine housing which substantially reduce the magnitude of the vibrations induced by the rotating component;
   (b) at least one vibration sensor attachable externally on the machine housing at the preselected location where the vibrations are to be reduced, said sensor for sensing the vibrations and generating an output signal representative thereof;
   (c) an electrical power means electrically connected to said electromagnetic exciter mechanism for generating and applying an input power signal to said electromagnetic exciter mechanism for operating the same; and
   (d) signal processing means coupled to the machine for sensing the frequency of the input power to the machine and generating an output signal representative thereof, said signal processing means being electrically connected to said power means and said vibration sensor for receiving said output signal from said sensor and processing said output signal representative of the induced vibrations together with said output signal representative of the input power frequency, comparing said processed signals with a standard signal representative of previous vibration correcting signals and in response thereto producing and applying a new correcting signal to said power means for modulating said input power signal to produce a corrected input power signal for operating said electromagnetic exciter mechanism to reduce the magnitude of vibrations induced at the preselected location on the machine housing by the rotating component.

2. The apparatus as recited in claim 1, wherein said electromagnetic exciter mechanism includes:
   a magnetic inertial mass; and
   electromagnetic means surrounding said mass and mountable to the machine housing, said electromagnetic means being operable for generating electromagnetic forces which cause vibratory movement of said mass relative to said electromagnetic means and said machine housing along each of three orthogonal axes when said electromagnetic means is mounted thereto and thereby induce electromagnetic reaction forces in said machine housing which reduce the magnitude of vibrations induced at the preselected location by rotating component.

3. The apparatus as recited in claim 2, wherein said electromagnetic means is also operable for generating electromagnetic forces to levitate said inertial mass out of contact with said electromagnetic means and the machine housing.

4. The apparatus as recited in claim 2, wherein said electromagnetic means includes:
   a first component for generating an electromagnetic force for causing said relative vibratory movement between said inertial mass and said first component in a first direction;
   a second component for generating another electromagnetic force for causing said relative vibratory movement between said inertial mass and said second component in a second direction being orthogonal to said first direction; and a third component for generating still another electromagnetic force for causing said relative vibratory movement between said inertial mass and said third component in a third direction being orthogonal to said first and second directions.

5. The apparatus as recited in claim 4, wherein said first component of said electromagnetic means is a first pair of electromagnets disposed in opposing relation about 180 degrees from one another at opposite axial ends of said inertial mass.

6. The apparatus as recited in claim 4, wherein said second component of said electromagnetic means is a second pair of electromagnets disposed in opposing relation about 180 degrees from one another on opposite sides of said inertial mass.

7. The apparatus as recited in claim 6, wherein said third component of said electromagnetic means is a third pair of electromagnets disposed in opposing relation about 180 degrees from one another on opposite sides of said inertial mass and displaced about 90 degrees from said respective second pair of electromagnets.

8. An electromagnetic exciter mechanism in a vibration reduction apparatus for use in reducing vibrations of a machine being induced by a rotating component of the machine, said electromagnetic exciter mechanism comprising:
(a) a casing mountable externally on the machine remote from the vibration-inducing rotating component thereof;
(b) a magnetic inertial mass; and
(c) electromagnetic means mounted to said casing and being operable for generating electromagnetic forces to cause levitation of said inertial mass out of contact with said electromagnetic means and said casing and vibratory movement of said mass relative to said casing and electromagnetic means along each of three orthogonal axes and thereby induce electromagnetic reaction forces in said casing and the machine when said casing is mounted thereto which substantially reduce the magnitude of vibrations induced in the machine by its rotating component.

9. The electromagnetic exciter mechanism as recited in claim 8, wherein said electromagnetic means includes:
a first component for generating an electromagnetic force for causing said relative vibratory movement between said inertial mass and said first component in a first direction;
a second component for generating another electromagnetic force for causing said relative vibratory movement between said inertial mass and said second component in a second direction being orthogonal to said first direction; and
a third component for generating still another electromagnetic force for causing said relative vibratory movement between said inertial mass and said third component in a third direction being orthogonal to said first and second directions.

10. The electromagnetic exciter mechanism as recited in claim 9, wherein said first component of said electromagnetic means is a first pair of electromagnets disposed in opposing relation about 180 degrees from one another at opposite axial ends of said inertial mass.

11. The electromagnetic exciter mechanism as recited in claim 9, wherein said second component of said electromagnetic means is a second pair of electromagnets disposed in opposing relation about 180 degrees from one another on opposite sides of said inertial mass.

12. The electromagnetic exciter mechanism as recited in claim 11, wherein said third component of said electromagnetic means is a third pair of electromagnets disposed in opposing relation about 180 degrees from one another on opposite sides of said inertial mass and displaced about 90 degrees from said respective second pair of electromagnets.

13. A vibration reduction method for use in reducing vibrations at a preselected location on a housing of a machine being induced by a rotating component mounted to the machine housing, said method comprising the steps of:
(a) externally coupling at least one electromagnetic exciter mechanism on the machine housing remote from the vibration-inducing rotating component of the machine, the electromagnetic exciter mechanism being operable for inducing electromagnetic reaction forces in the machine housing which substantially reduce the magnitude of vibrations induced by the rotating component;
(b) externally on the machine housing at the preselected location where the vibrations are to be reduced, sensing the vibrations induced by the rotating component and generating an output signal representative thereof;
(c) sensing the frequency of an input power signal to the machine which drives the rotating component and generating an output signal representative thereof;
(d) receiving the output signal representative of the induced vibrations sensed and processing such output signal representative of the induced vibrations together with the output signal representative of the input power frequency;
(e) comparing the processed signals with a standard signal representative of previous vibration correcting signals and in response thereto producing a new correcting signal; and
(f) generating a power signal and applying the new correcting signal for modulating said power signal to produce a corrected input power signal for operating the electromagnetic exciter mechanism to reduce the magnitude of vibrations induced at the preselected location on the machine housing by the rotating component.

14. The method as recited in claim 13, wherein said input power signal frequency sensing includes sensing the frequency of the input power signal being supplied through a motor power supply cable to the machine.

15. The method as recited in claim 13, wherein said receiving and processing includes comparing the output signal generated by sensing the frequency of the input power signal with the output signal generated by sensing the vibrations of the machine housing, and generating an output signal from the comparison which represents the rotational frequency of the rotating component.

* * * * *